US008152175B1

(12) United States Patent  (10) Patent No.: US 8,152,175 B1
Maro et al.  (45) Date of Patent: Apr. 10, 2012

(54) JAW ASSEMBLY

(76) Inventors: Scott J. Maro, Gwinner, ND (US);
Glenn A. Wilcox, Wyndmere, ND (US)

( * ) Notice: Subject to any disclaimer, the term of this patent is extended or adjusted under 35 U.S.C. 154(b) by 1509 days.

(21) Appl. No.: 11/615,755

(22) Filed: Dec. 22, 2006

(51) Int. Cl.
*B23B 31/16* (2006.01)
(52) U.S. Cl. .......................... 279/123; 279/110; 279/124
(58) Field of Classification Search ................. 279/2.21, 279/110, 112–124; *B23B 31/16*
See application file for complete search history.

(56) References Cited

U.S. PATENT DOCUMENTS

| | | | |
|---|---|---|---|
| 435,405 A * | 9/1890 | Cushman | 279/123 |
| 1,315,467 A * | 9/1919 | Church | 279/112 |
| 1,341,015 A * | 5/1920 | Lavoie | 279/119 |
| 1,372,726 A | 3/1921 | Sloan | |
| 1,446,060 A * | 2/1923 | Pratt | 82/165 |
| 3,190,666 A * | 6/1965 | Testa | 279/123 |
| 4,029,325 A | 6/1977 | Rohm | |
| 4,221,391 A | 9/1980 | Dutton | |
| 4,556,228 A * | 12/1985 | Ferraro | 279/154 |
| 4,561,663 A | 12/1985 | Ferraro | |
| 4,569,530 A | 2/1986 | Cross | |
| 4,667,971 A | 5/1987 | Norton et al. | |
| 4,667,972 A * | 5/1987 | Hiestand | 279/123 |
| 4,763,906 A | 8/1988 | Barbieux | |
| 4,960,285 A | 10/1990 | Doi | |
| 4,982,970 A | 1/1991 | Otani et al. | |
| 5,190,300 A * | 3/1993 | Jaggers | 279/124 |
| 5,330,205 A | 7/1994 | Norton | |
| 5,649,694 A | 7/1997 | Buck | |
| 5,735,534 A | 4/1998 | Edwards | |
| 5,842,704 A | 12/1998 | Gilliam | |
| 5,842,705 A | 12/1998 | Tabachenko et al. | |
| 5,893,551 A | 4/1999 | Cousins et al. | |
| 5,899,464 A | 5/1999 | DeFeo | |
| 6,241,261 B1 | 6/2001 | Rehm | |
| 6,264,210 B1 | 7/2001 | Difasi et al. | |
| 6,880,831 B2 | 4/2005 | Taglang | |
| 6,957,809 B1 | 10/2005 | Ferrara et al. | |

* cited by examiner

*Primary Examiner* — Eric A Gates

(74) *Attorney, Agent, or Firm* — Anthony J. Bourget

(57) ABSTRACT

A jaw and a related jaw assembly, the jaw assembly having a master jaw with a longitudinal axis and top and bottom surfaces, first and second side surfaces, a master jaw bore extending longitudinally therein between the top and bottom surfaces, and a channel extending from the first side surface to the second side surface generally transverse the longitudinal axis, and a top jaw adapted to be coupled to the master jaw and defining a top jaw bore positioned in substantial alignment with the master jaw bore.

29 Claims, 6 Drawing Sheets

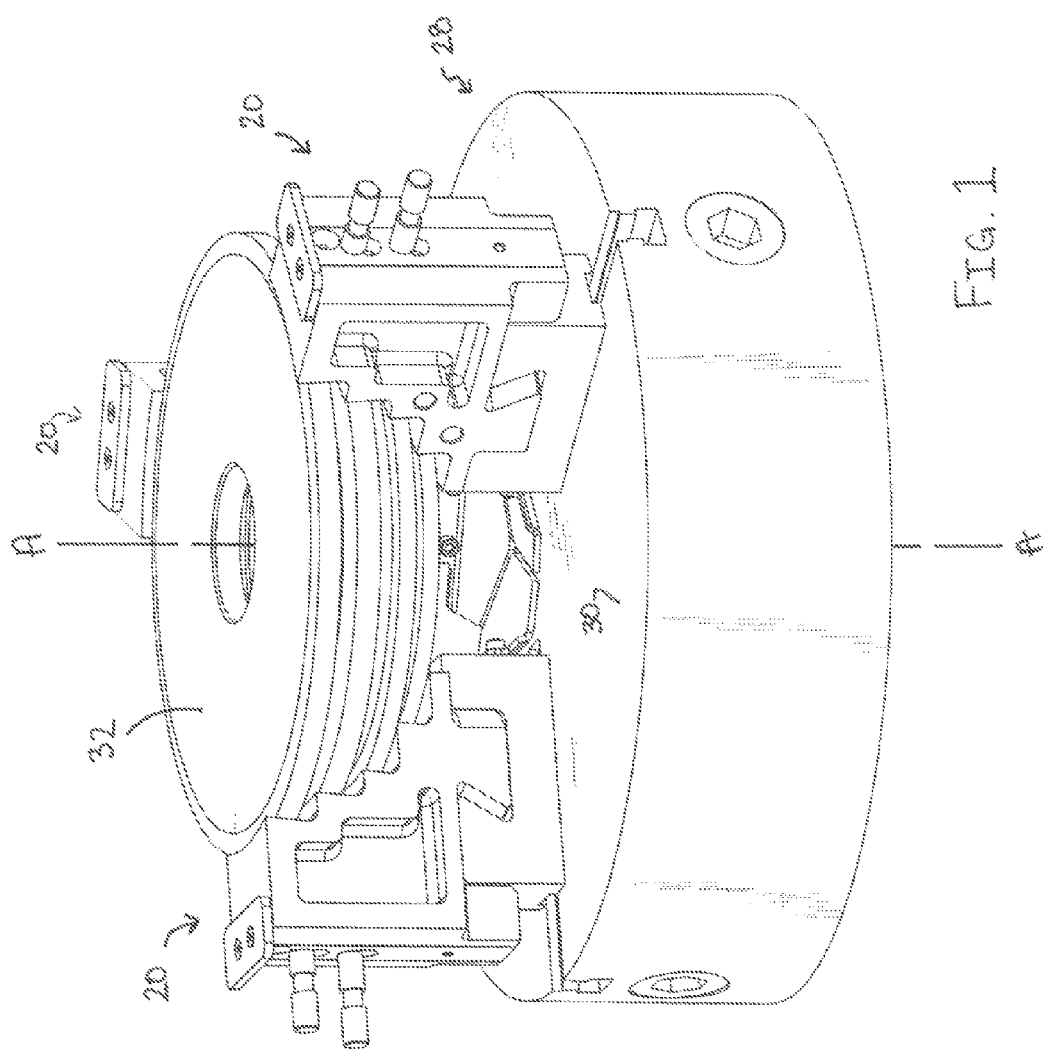

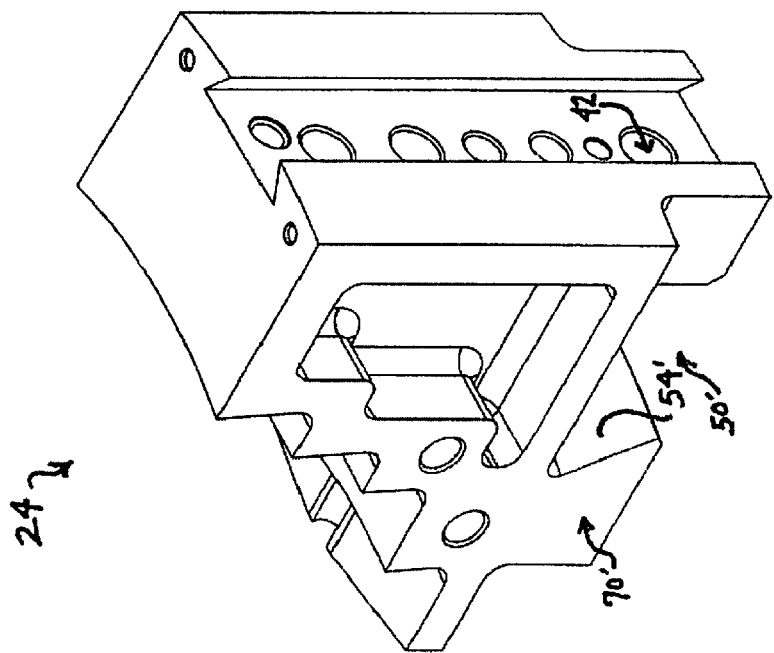
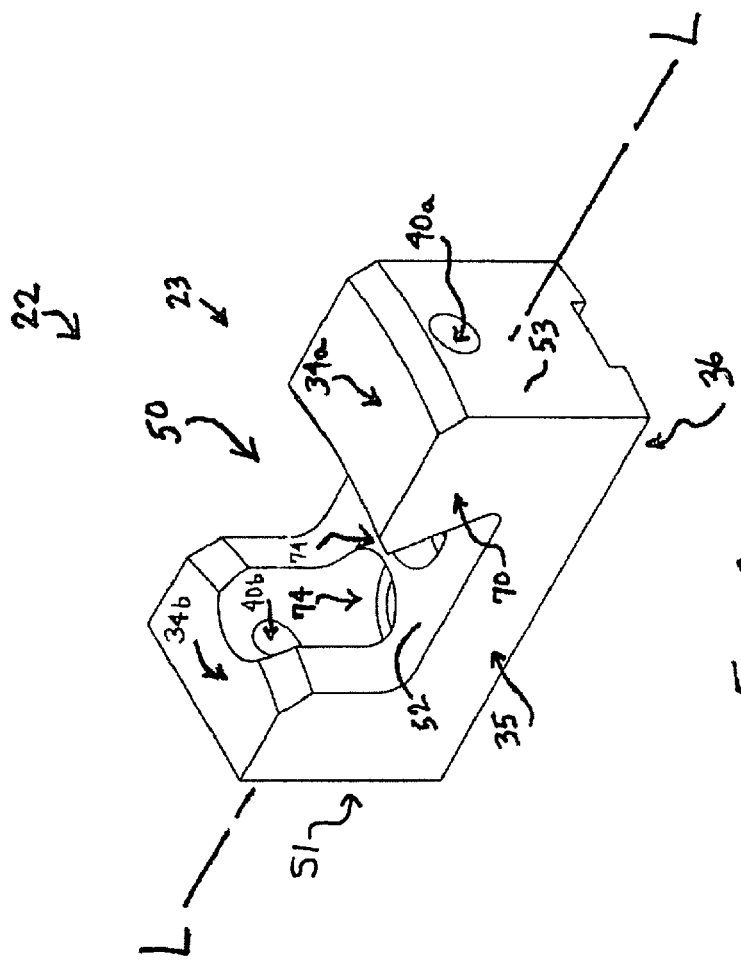

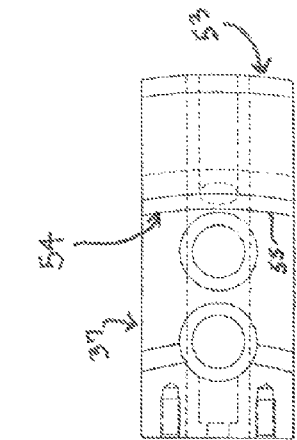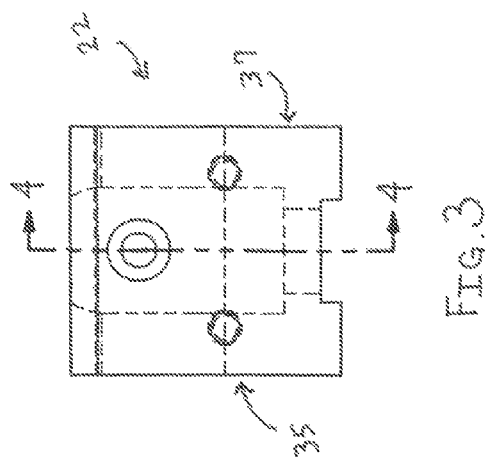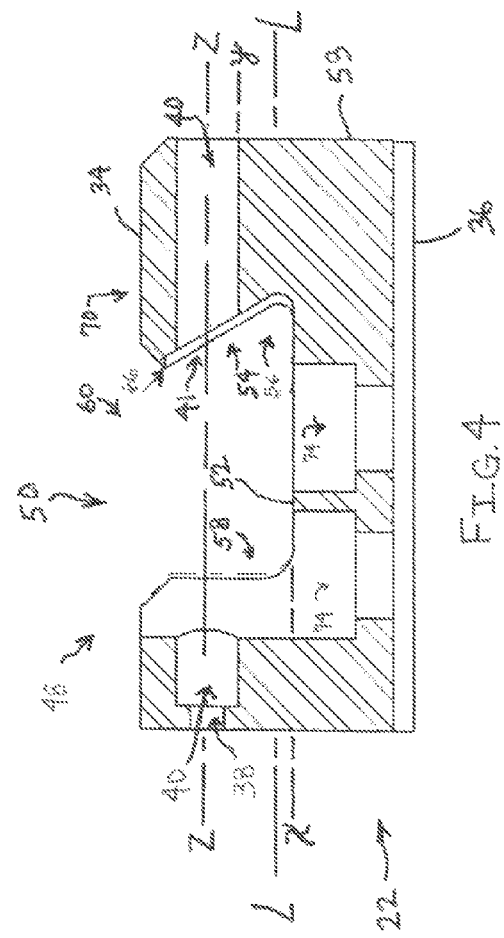

JAW ASSEMBLY

BACKGROUND OF THE INVENTION

1. Field of the Invention

The present invention relates generally to jaw assemblies and related jaw components for a jaw chuck for holding a workpiece to a spindle of a machine.

2. Background Information

Jaw assemblies are used for holding a work piece to the spindle of a rotary machine, such as a lathe. A jaw assembly typically works in conjunction with additional jaw assemblies coupled to a chuck body for simultaneously reciprocating radial movement with respect to the chuck body to provide self-centering gripping of the workpiece. A chuck jaw assembly typically includes a radially displaceable master jaw mounted on the chuck body and a top jaw releasably secured to the master jaw to facilitate rapid jaw change. The top jaw provides a gripping or clamping surface adapted to engage a work item at either its inside or outside diameter. The top jaw holds the item during a machining operation. Typically the clamping surfaces on the top jaw are machined after the top jaws have been mounted on the master jaws to assure concentricity of the clamping surfaces relative to the axis of rotation of the chuck.

Jaw assemblies of the rapid change variety are particularly useful for repetitive small batch production operations involving frequent changeover. At the end of a production run the top jaws are usually removed from the chuck and replaced with another set of top jaws adapted to accommodate the next workpiece which may vary substantially with respect to the previously machined workpiece. Precise concentricity of the jaw clamping surfaces must be maintained to achieve close tolerance workholding. Desired close tolerances can be maintained by rematching the top jaws after changeover, however the rematching process is costly and time consuming.

The top jaws and master jaws may also be marked and maintained as matched pairs for subsequent use in order to maintain precise concentricity after jaw changeover. This approach, which is recommended with all jaws, including the present ones, is subject to error and makes the interchangeability of top jaws difficult or impossible. If proper matching is not maintained, desired surface concentricity may be lost, resulting in poor performance or damage to workpieces or machinery.

Various jaw assemblies have been available which provide interchangability among top jaws so that the jaws may be randomly assembled with the master jaws on a chuck without rematchining while still maintaining concentricity. One example of such a jaw assembly that provides a sustained biasing force of substantial magnitude for urging reference surfaces on the jaws into and maintaining the surfaces in coengagement to assure precise top jaw and master jaw alignment is found in U.S. Pat. No. 5,842,705 to Tabachenko et al. However, despite their ingenuity, this and other references generally use complex mounting mechanisms and are usually costly to produce. Such interchangeable jaw assemblies often use spring biasing or other complicated mechanisms for urging surfaces on the master and top jaws into coengagement and often fail to provide the degree of reliability and chucking concentricity desired.

Prior jaw assembly devices typically include a top jaw mounted rigidly to a master jaw or chuck. Once the top jaw is rigidly mounted, then the chuck is operated to close the jaw or respective jaws upon a piece to be machined. The rigid jaw mounting generally requires the set of jaw assemblies to be in proper alignment with respect to each other. Even slight differences or changes in the top jaw at a workpiece contact point may cause the structure to be out of balance. Obtaining precise concentricity is difficult due to the rigid mounting of the respective jaw assemblies. It would be desired to establish a structure where it would be possible to have the top jaw self-adjust when pressure is applied to the respective jaws while tightening the jaws about a workpiece. A self-adjusting top jaw could thereby act as an automatic setting or centering of the jaw elements to obtaining a concentric arrangement. Of course, having the jaws set into a secure position after tightening is desired so proper use of the device, such as a lathe chuck, may occur without failure or damage to the equipment, surroundings, or workpieces.

Heretofore there has been little, if any, appreciation that a soft, loose or non-rigid initial mounting of a jaw, which when tightened by a normal chuck tightening operation, could possibly result in the setting of the jaw into a secure or rigid concentric mount. Such function would be contrary to the typical practice of rigidly presetting the jaw, and instead would utilize the resulting tightening forces to accomplish the concentric mounting.

Accordingly, it is a general desire of the present invention to provide an improved interchangeable type quick-change jaw assembly of simple construction where a top jaw and master jaw are configured so as to flex and self-adjust into proper concentric alignment. A further desire is to provide such a jaw assembly of simple construction where a single fastener releasably secures a top jaw to a master jaw and where the jaws are configured so as to provide a secure engagement and precise top jaw and master jaw alignment. These and other desires may be apparent as presented throughout the remainder of this specification.

SUMMARY OF THE INVENTION

The present invention is directed toward a jaw assembly comprising a master jaw having a longitudinal axis and comprising top and bottom surfaces, first and second side surfaces, a master jaw bore extending longitudinally therein between the top and bottom surfaces, and a channel extending from the first side surface to the second side surface generally transverse the longitudinal axis, and a top jaw adapted to be coupled to the master jaw and defining a top jaw bore positioned in substantial alignment with the master jaw bore.

A further aspect of the invention includes a jaw assembly for use in conjunction with a chuck having an axis of rotation, the jaw assembly comprising a first jaw having a longitudinal axis, a second jaw adapted to be coupled with the first jaw, the second jaw having a projection extending into an opening defined by the first jaw, and a fastener extending through at least a portion of the first jaw and through at least a portion of a bore defined by the projection.

A further aspect of the invention includes a jaw adapted to be coupled with a second jaw of a jaw assembly for holding a workpiece to the jaw chuck of a machine, the jaw comprising a body having a longitudinal axis and top and bottom surfaces and defining a jaw bore extending longitudinally therein between the top and bottom surfaces, and defining a channel extending generally transverse the longitudinal axis, the channel defined in part by a channel bottom and having a channel top opening, the jaw bore positioned between the channel bottom and the channel top opening.

Yet a further aspect of the present invention includes a jaw assembly comprising a master jaw having a longitudinal axis and comprising a body defining a master jaw bore extending longitudinally therein and defining a channel oriented generally transverse the longitudinal axis, the channel defined in part by a channel bottom; and a top jaw adapted to be coupled to the master jaw and defining a top jaw bore positioned in substantial alignment with the master jaw bore. The jaw preferably includes a foot extending into the channel, the foot having a top jaw bottom surface, the top jaw bottom surface and the channel bottom defining a gap. Preferably the entirety of the top jaw bottom surface is positioned in a spaced relation from the channel bottom.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 1 is a perspective view of a machine tool chuck having jaw assemblies embodying the present invention and shown with a workpiece situated therebetween.

FIG. 2 is a perspective view of a master jaw made in accordance with the present invention.

FIG. 3 is a rear elevation view of the master jaw of FIG. 2.

FIG. 4 is a section view taken along line 4-4 of FIG. 3.

FIG. 5 is a plan view of the master jaw of FIG. 2.

FIG. 6 is a perspective view of a top jaw made in accordance with the present invention.

Figure 8:
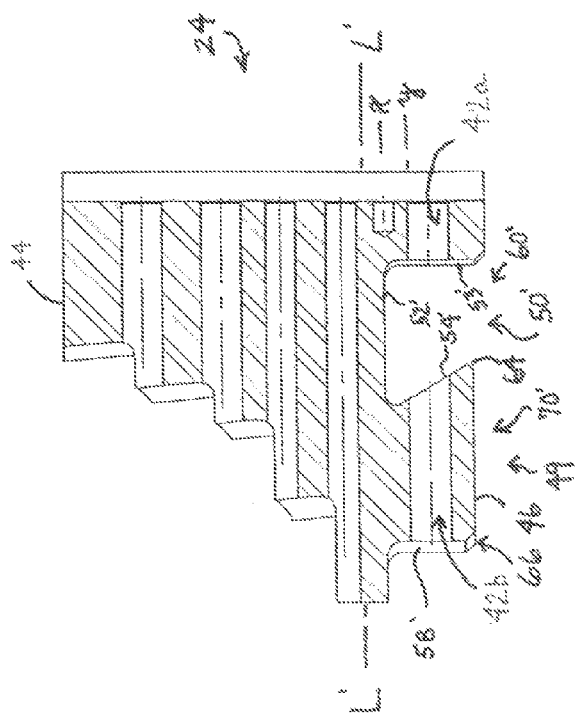
FIG. 8 is a section view taken along line 8-8 of FIG. 7.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

Referring now to the Figures, a jaw assembly according to the present invention is generally depicted with reference to numeral 20. In one aspect, jaw assembly 20 includes a master jaw 22 and a top jaw 24. Typically master jaw 22 is connected to a T-nut 26 which is in turn securable within a jaw chuck 28. Jaw chuck 28 may be suitable for use in any machine tool which requires a rotary or stationary chuck, but is particularly adapted for use in a high production machine tool and may be arranged to clamp and hold an item or workpiece (such as but not limited to workpiece 32) at either its outside diameter or its inside diameter. Typically and preferably a trio of jaw assemblies 20 are situated on a jaw chuck as indicated generally in FIG. 1. As shown in FIG. 1, workpiece 32, which happens to be a disk-like piece or sprocket component, is held at its outside diameter. It may be appreciated that a variety of workpiece items 32 may be held. Top jaw 24 may be modified to fit the particular workpiece 32 as desired. Various workpiece contacts 68 can be arranged as desired to accommodate holding of different pieces. The jaw assemblies 20 are preferably power actuated (not shown) for radial movement generally toward and away from the axis of rotation A. Power operated chuck jaw actuating mechanisms are well known in the chucking art. The jaw assemblies of the present invention may be employed in a variety of applications of either power or manually operated varieties.

Preferably each jaw assembly 20 includes master jaw 22 and top jaw 24. As shown in FIG. 2, FIG. 3, FIG. 4, and FIG. 5, master jaw 22 has a longitudinal axis L extending lengthwise therethrough (and indicating a longitudinal direction) from a front side surface 51 to a back side surface 53 and visa versa. Preferably, axis L is aligned generally normal to axis of rotation A (and preferably generally parallel with jaw chuck face 30 of jaw chuck 28). Master jaw 22 includes a body 23 which defines a master jaw bore 40 therein. Bore 40 extends longitudinally therein between top surface 34 and bottom surface 36 as generally shown. Bore 40 extends generally lengthwise through jaw 22, or at least preferably substantially therethrough. At a top portion 48, master jaw 22 defines a channel 50 extending generally transverse longitudinal axis L. Preferably channel 50 extends from a first side surface 35 to a second side surface 37, where first side surface 35 and second side surface 37 may define a width spanning a distance less than a lengthwise distance between front side surface 51 and back side surface 53. Channel 50 is defined in part by a channel bottom 52 of master jaw 22. Channel bottom 52 is preferably a generally flat surface. It may be appreciated that bore 40 is in communication with channel 50. Preferably channel 50 extends generally transverse longitudinal axis L and preferably perpendicular to axis of rotation A when placed on jaw chuck 28.

As shown in FIG. 4, channel bottom 52 is positioned at a level "x" below a level "y" of major jaw bore 40. Channel 50 is defined in part by an angled or rearwardly converging surface 54. Angled surface 54 is positioned opposite proximal surface 58. Angled surface 54 is angled with respect to axis A and longitudinal axis L. While not limited thereto, angled surface 54 is shown to be angled about 30 degrees with respect to a vertical axis. It may be appreciated that other angle measurements may be used. It may be appreciated that angled surface 54 is a distal surface with respect to axis A. Angled surface 54 is similar to a portion of a dove-tail surface (or at least one half of such a surface). A base portion 56 of surface 54 angles generally downwardly and away with respect to axis A and proximal surface 58. Preferably, angled surface 54 is cut on a radius or is arcuate as generally shown in FIG. 5. It may be appreciated that channel 50 may be defined in part by a conical surface of revolution.

Channel 50 includes a channel top opening 60. Jaw bore 40 is positioned a first distance from top opening 60 (generally the distance from top surface 34 to bore level "y") whereas channel bottom 52 is positioned a second and greater distance (generally the distance from top surface 34) from channel bottom level "x". At least a portion of channel bottom 52, and preferably all of channel bottom 52, is positioned at a level "x" below a level "y" of master jaw bore 40.

In a preferred aspect, master jaw 22 defines a first master jaw bore 40a and a second master jaw bore 40b, with bore 40a formed at a region between upper surface 34a and bottom surface 36, and bore 40b formed at a region between upper surface 34b and bottom surface 36. It may be appreciated that bore 40*a* and 40*b* are at least substantially aligned along a common axis "z" and preferably identically aligned or in alignment with common axis "z". While bore 40 may have a non-circular configuration, preferably bore 40 has a circular configuration. Channel 50 is preferably positioned between first master jaw bore 40*a* and second master jaw bore 40*b*. Master jaw 22 further includes a projection or a foot 70 as generally shown. It may be appreciated that foot 70 defines master jaw bore 40 and angled surface 54. Foot 70 is further described below in relation to a complementary coengagement with top jaw 24. Preferably master jaw 22 is made from a common blank, or stock which is well known in the industry, and modified to the configuration as described herein. Typically master jaw 22 is made of relatively soft or unhardened steel so that it may be modified as desired.

Figure 9:
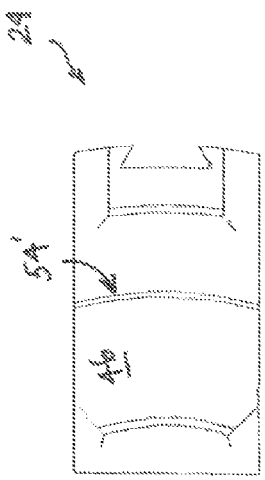
FIG. 9 is a bottom view of the top jaw of FIG. 6.
Figure 7:
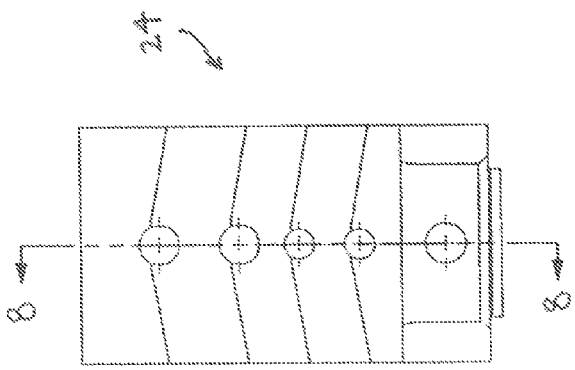
FIG. 7 is a front elevation view of the top jaw of FIG. 6.
Figure 11:
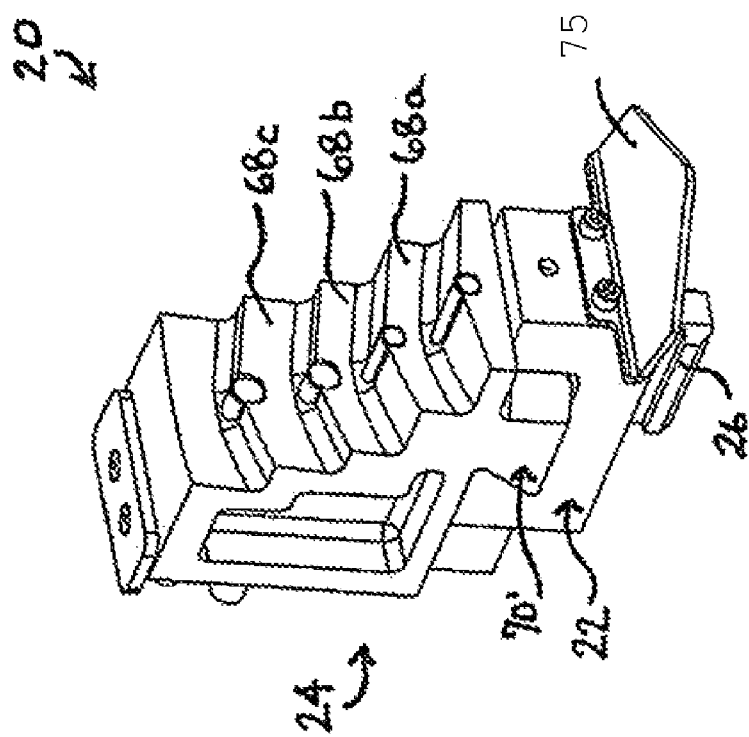
FIG. 11 is a further perspective view of the jaw assembly of FIG. 10
Figure 10:
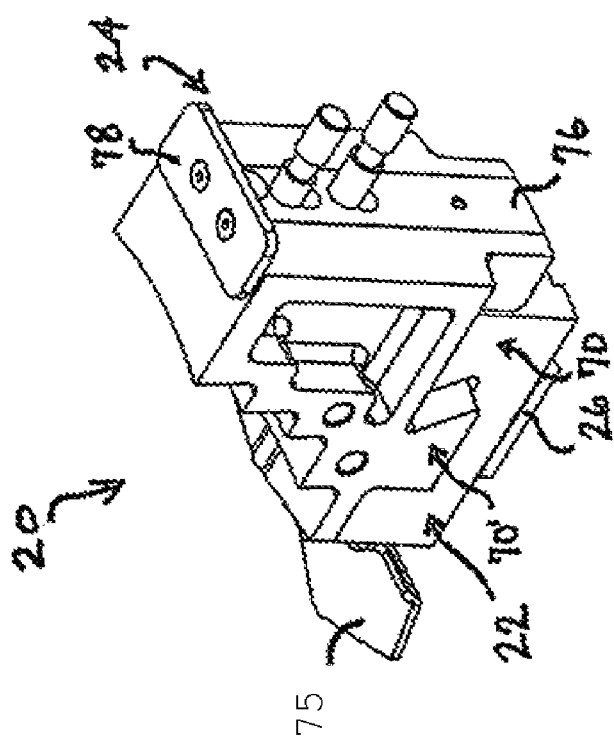
FIG. 10 is a perspective view of a jaw assembly embodiment of the present invention together with a T-nut, nose guard, safety plate, seal handle and dowels.
Figure 12:
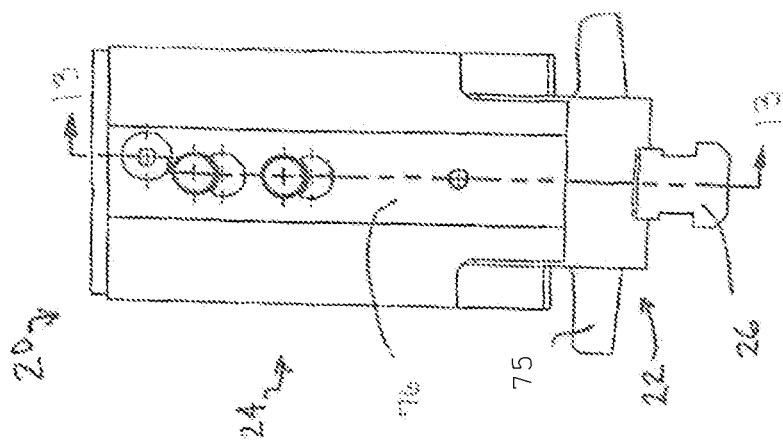
FIG. 12 is a rear elevation view of the jaw assembly of FIG. 10.

Top jaw 24 is shown in further detail in FIG. 6, FIG. 7, FIG. 8 and FIG. 9. Top jaw 24 has a longitudinal axis L' extending lengthwise therethrough. Preferably axis L' is aligned parallel with axis L. Top jaw 22 defines a top jaw bore 42 therein. Bore 42 extends longitudinally therein between top surface 44 and bottom surface 46 as generally shown. Bore 42 extends generally lengthwise through jaw 24, or at least preferably substantially therethrough. At a lower portion 49, top jaw 24 defines a channel 50' extending generally transverse longitudinal axis L'. Channel 50' is defined in part by a channel bottom 52' of top jaw 24. Channel bottom 52' is preferably a generally flat surface. It may be appreciated that bore 42 is in communication with channel 50'. As shown in FIG. 8, channel bottom 52 is positioned at a level "x" "below" a level "y" of top jaw bore 42. Channel 50' is defined in part by an angled or rearwardly converging surface 54'. Preferably angled surface 54' is angled to compliment or coengage with angled surface 54. Angled surface 54' is positioned opposite proximal surface 58'. Angled surface 54' is also positioned opposite back surface 53' which in part together define channel 50'. Preferably back surface 53' is cut on a radius or is arcuate. It may be appreciated that angled surface 54' is a distal surface with respect to axis A as compared to proximal surface 58'. Angled surface 54' is similar to a portion of a dove-tail surface (or at least one half of such a surface). Preferably, angled surface 54' is cut on a radius or is arcuate as generally shown in FIG. 9. It may be appreciated that channel 50' may be defined in part by a conical surface of revolution. Channel 50' includes a channel "top" opening 60'. Jaw bore 42 is positioned a first distance from top opening 60' (generally the distance from top jaw bottom surface 46 to bore level "y") whereas channel bottom 52' is positioned a second and greater distance from top opening 60' (generally the distance from top jaw bottom surface 46) from channel bottom level "x". At least a portion of channel bottom 52', and preferably all of channel bottom 52', is positioned at a level "x" "below" a level "y" of jaw bore 42.

Top jaw 24 further includes a projection or foot 70' as generally shown which projects from a main body 25 of top jaw 24. It may be appreciated that foot 70' defines top jaw bore 42 and angled surface 54'. Foot 70' is further described below in relation to a complementary coengagement with master jaw 22. Preferably top jaw 24 is made of hardened steel. Preferably foot 70' is integrally connected to jaw 24.

As shown with reference to FIG. 10, FIG. 11, FIG. 12 and FIG. 13, an individual jaw assembly 20 includes master jaw 22 and top jaw 24. Master jaw 22 connects to chuck 28 by use of T-nut 26 which slides into a radial groove of chuck 28 in known fashion. Preferably master jaw 22 is connected to T-nut with t-nut fastener 72 which insert into fastener holes 74. It may be appreciated that T-nut 26 may alternatively be integrally connected to master jaw 22. Top jaw 24 and master jaw 22 are adapted to be coupled together. Particularly, foot 70' of top jaw 24 is configured to insert into channel 50 of master jaw 22. It may be appreciated that foot 70 of master jaw 24 may also insert into channel 50' of top jaw 24. Preferably foot 70' defines top jaw bore 42 which is positioned in alignment with master jaw bore 40. More preferably, top jaw bore 42 is positioned in alignment with master jaw bore 40*a* and master jaw bore 40*b*.

Figure 13:
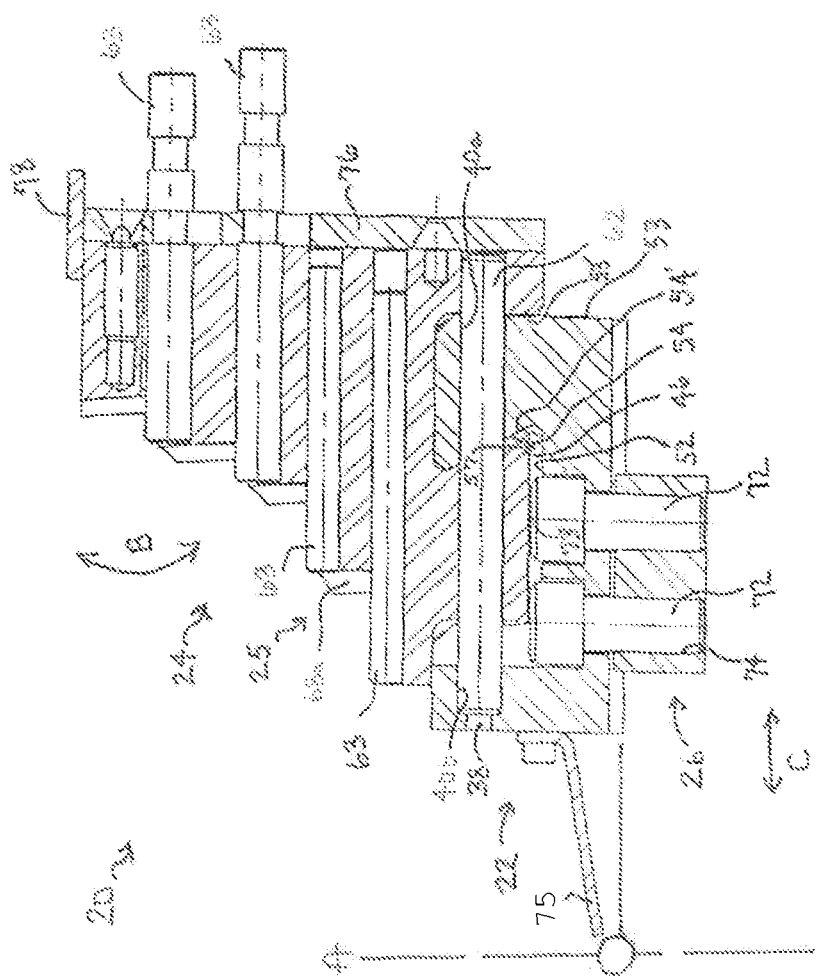
FIG. 13 is a section view taken along line 13-13 of FIG. 12.

Top jaw 24 is coupled to master jaw by moving top jaw 24 generally in the direction designated by arrow B of FIG. 13. A toe 64 (see for instance FIG. 8) of foot 70' passes shoulder 66 (see for instance FIG. 4) of master jaw 22 and sets within base portion 56 while a heel 66 sets within channel 50. Angled surface 54' of foot 70' engages with angled surface 54 of master jaw 22. As shown in FIG. 13, top jaw bottom surface 46 and channel bottom 52 define a gap 57. Preferably jaw bottom surface 46 is in spaced relation to head 73 of T-nut fastener 72. Preferably the entirety of top jaw bottom surface 46 is positioned in a spaced relation from channel bottom 52 to define gap 57. The importance of gap 57 is described further below.

Once top jaw 24 is positioned with top jaw bore 42 in alignment with master jaw bore 40 (i.e., generally in alignment with respect to axis "z"), a fastener 62, such as a dowel, and preferably a threadless dowel 62, is positioned within master jaw bore 40 and top jaw bore 42 to hold or preferably loosely secure top jaw 24 to master jaw 22. While not required or preferred, fastener 62 may be threaded as desired to match with threads defined by bores 40, 42. A threaded fastener however increases the likelihood of trapping dirt or debris and may tend to be too loose resulting in poor performance. Preferably dowel 62 is made from high quality steel and is hardened for better quality and useful life. Angled surface 54 defines a bore opening 41 of bore 40 through which passes fastener 62.

As jaw assembly 20 is moved in the direction of arrow C, which is accomplished in known fashion, top jaw 24 engages with a workpiece 32. Such engagement imparts a force or counterforce upon angled surfaces 54, 54', causing top jaw 24 to "bottom out" or self adjust by sliding downward along the coengaging angled surfaces 54, 54' and into, or further into, gap 57, to snugly set within master jaw 22. Particularly, with fastener 62 in place, radial forces applied to top jaw 24 resulting from tightening of the assembly 20 or movement in the direction of arrow C, cause toe 64 to settle in a natural fit position, aided by the curvature or radius 55 of angled surface 54. It may be appreciated that movement or adjustment of top jaw 24 within master jaw 22 may include movement, including twisting movement or other movement, in a direction generally normal to the surface of the drawing sheet. It may also be appreciated that the tightening action of movement about workpiece 32 may cause top jaw bore 42 to realign or adjust with respect to master jaw bore 40 (i.e., bore 42 may tend to become off-set or slightly off-set from alignment with master jaw bore 40 about or from axis "z"). Such adjustments result in part given tolerances between dowel 62 and bore 40 or bore 42. Where a force is applied against top jaw 24 outward from axis A, top jaw 24 tends to move downward toward master jaw 22 due to the geometry of the angled surfaces 54, 54', thereby assisting in maintaining a solid connection and further assisting with the concentric setting of jaw assembly 20.

It may be further appreciated that slight gaps or tolerance differences, including gap 57, within the foot-to-channel engagement allow top jaw 24 and master jaw 22 to flex or move relative to each other to assist in the automatic concentric contact between angled surfaces 54, 54'. It may be further appreciated that absence of gap 57 (i.e., if bottom surface 46 were to engage with channel bottom 52 or head 73), little, if any, downward motion could be accomplished to set foot 70' within channel 50. Preferably bottom surface 46 maintains a spaced relationship with bottom 52. It may be appreciated that a portion of gap 57 positioned above head 73 is very small (and not shown in detail in the figures). One non-limiting preferred example includes such gap 57 to be about 0.030 of an inch. In a tightening action, gap 57 above head 73 will narrow, and in an extreme and non-limiting example, may narrow to about 0.29 of an inch. As the trio of jaw assemblies 20 are simultaneously tightened about workpiece 32, it may be appreciated that multiple automatic adjustments of the top jaws 24 within their respective master jaws 22 accommodate for concentric alignment about the axis of rotation A and setting of respective top jaws 24. Such self-adjustment may be made for each successive workpiece 32 to be machined.

Top jaw 24 may be quickly removed and replaced by removing fastener 62 and thereafter uplifting top jaw 24 by rotation generally in the direction of arrow B. A top jaw 24 having a different workpiece contact 68 configuration to match a different workpiece may be quickly inserted within master jaw 22. In doing so, there is reduced concern about matching a particular top jaw 24 with a paired master jaw 22 since the top jaw 24 would be insertable and self-adjusting in whatever master jaw 24 to which it is aligned. It may be appreciated that fastener 62 preferably extends into master bore 40*b* to inhibit movement of top jaw 24 in an upward direction. Master jaw bore 40*b* may extend to an end of master jaw 24 or may alternatively include an access port 38 of smaller diameter as generally shown, which smaller profile lessens the occurrence of chip build-up therein caused by a machining operation.

It may be appreciated that jaw assembly 20 may be equipped with a deflector plate 75 of common variety. A cover plate 76 is provided to effectively cover fastener 62. It may also be appreciated that additional fasteners 63 or dowels may be provided within bores longitudinally provided within top jaw 24. Cover plate 76 operates to secure such additional fasteners 63. A seal handle 78 is preferably provided atop top jaw 24.

A further aspect of the invention includes the method of assembling a jaw assembly 20 on a chuck body 28 having a central axis A. The method includes supporting master jaw 22 on the chuck body 28 for radial movement generally toward and away from the central axis A. Top jaw 24 is then engaged with master jaw 22, and fastener 62 is inserted through a portion of top jaw 24. Fastener 62 is oriented generally normal to central axis A. Master jaw 22 and top jaw 24 preferably define angled coengaging arcuate surfaces 54, 54' with fastener 62 passing through the surfaces. Preferably fastener 62 passes through bore 42 defined by top jaw 24 and again into master jaw 22. Preferably fastener 62 is inserted into top jaw 24 and within master jaw 22 and again through a portion of top jaw 24, preferably a projection or foot 70', and then again into master jaw 22.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A jaw assembly comprising:
   a master jaw having a longitudinal axis and comprising:
      top and bottom surfaces;
      first and second side surfaces;
   a master jaw bore extending longitudinally therein between said top and bottom surfaces, said master jaw bore oriented radially with respect to a chuck to which said master jaw may attach; and
   a channel extending from said first side surface to said second side surface generally transverse said longitudinal axis; and
   a top jaw adapted to be coupled to said master jaw and defining a top jaw bore positioned in substantial alignment with said master jaw bore.

2. The assembly of claim 1 wherein said channel defines an arcuate surface.

3. The assembly of claim 1, further comprising:
   said channel has a top portion and a bottom portion;
   said channel is formed at a top portion of said master jaw; and
   said channel extending generally transverse said master jaw bore, and
   where said channel is defined in part by a channel bottom of said master jaw, at least a portion of said channel bottom positioned at a level below a level of said master jaw bore.

4. The assembly of claim 1 wherein said channel is partially defined by a downwardly angled surface.

5. The assembly of claim 4 wherein said channel is partially defined by an arcuate rearwardly converging conical surface.

6. The assembly of claim 4, further comprising:
   where said channel is partially defined by a channel bottom, said downwardly angled surface positioned at an acute angle with respect to said channel bottom.

7. The assembly of claim 1 wherein said channel is partially defined by a conical surface of revolution.

8. The assembly of claim 1 wherein said master jaw is adapted for complementary coengagement with a conical surface of a foot of said top jaw.

9. The assembly of claim 1 wherein said master jaw defines a first master jaw bore and a second master jaw bore, said second master jaw bore positioned in alignment with said first master jaw bore.

10. The assembly of claim 1 wherein said top jaw includes a foot positioned in said channel, said foot defining said top jaw bore positioned in alignment with said master jaw bore.

11. The assembly of claim 1 wherein said master jaw bore includes a first master jaw bore and a second master jaw bore and wherein said top jaw includes a foot defining said top jaw bore, said top jaw bore positioned in alignment with said first master jaw bore and said second master jaw bore.

12. The assembly of claim 1 further comprising a fastener positioned within said master jaw bore and said top jaw bore.

13. The assembly of claim 1 wherein said assembly includes a T-nut, said master jaw including at least one bore in communication with a bore defined by said T-nut.

14. The assembly of claim 1 wherein said assembly includes a T-nut integrally connected to said master jaw.

15. A jaw assembly comprising:
   a master jaw having a longitudinal axis running along a length of said master jaw and comprising:
      top and bottom surfaces;
      first and second side surfaces defining a width;
   a back surface and a front surface, where said length extends from said front surface to said back surface and said length spans a distance greater than a distance of said width;
   a master jaw bore extending longitudinally therein between said to and bottom surfaces; and a channel extending from said first side surface to said second side surface generally transverse said longitudinal axis, said channel is an arcuate channel formed at a top portion of said master jaw; and a top jaw adapted to be coupled to said master jaw and defining a top jaw bore positioned in substantial alignment with said master jaw bore.

16. The assembly of claim 15 where said channel defines a rearwardly converging surface.

17. A jaw assembly for use in conjunction with a chuck having an axis of rotation, said jaw assembly comprising:

a first jaw having a longitudinal axis running in a radial direction with respect to the axis of rotation of the chuck;

a second jaw adapted to be coupled with said first jaw, said second jaw having a projection extending into an opening defined by said first jaw; and a fastener extending through at least a portion of said first jaw and through at least a portion of a bore defined by said projection, said bore running generally parallel with the longitudinal axis of said first jaw and completely encircling at least a portion of said fastener.

18. The jaw assembly of claim 17 wherein said projection is integrally connected to said second jaw and wherein said fastener is aligned generally normal to the axis of rotation of the chuck.

19. The jaw assembly of claim 17 where said first jaw includes an angled surface being non-parallel with respect to the axis of rotation, and wherein said fastener is a dowel which passes through said angled surface.

20. The jaw assembly of claim 19 wherein said dowel extends through coengaging arcuate angled surfaces defined by said first jaw and said second jaw.

21. The jaw assembly of claim 17 wherein said first jaw defines a bore aligned substantially along said longitudinal axis, said first jaw including a channel aligned generally perpendicular to the axis of rotation and generally transverse said bore, said channel receiving said projection.

22. A chuck including a chuck body having a central axis of rotation and at least one jaw assembly made in accordance with claim 17 wherein said jaw assembly is supported on said chuck body for radial movement generally toward and away from said central axis of rotation.

23. A jaw adapted to be coupled with a second jaw of a jaw assembly for holding a workpiece to the jaw chuck of a machine, said jaw comprising:

a body having a longitudinal axis and top and bottom surfaces and defining a jaw bore extending longitudinally therein between said top and bottom surfaces, and defining a channel extending generally transverse said longitudinal axis and said channel extending from a first side surface to a second side surface, said channel defined in part by a channel bottom and having a channel top opening where said channel bottom and said channel top opening extend from said first side surface to said second side surface, said jaw bore positioned between said channel bottom and said channel top opening.

24. The jaw of claim 23, further comprising:

said body has a length greater than a width;

said longitudinal axis extends along said length, and wherein said jaw is one selected from the group comprising a master jaw and a top jaw.

25. The jaw of claim 23 wherein said channel is defined in part by an arcuate angled surface, and wherein said channel traverses said jaw bore.

26. A jaw assembly comprising an engagement of a said jaw of claim 23 with another of said jaw of claim 23.

27. A jaw assembly comprising:

a master jaw comprising a body defining a master jaw bore extending longitudinally therein and defining a channel oriented generally transverse said master jaw bore, said channel defined in part by a channel bottom, said master jaw bore oriented radially with respect to a chuck to which said master jaw may be attached; and a top jaw adapted to be coupled to said master jaw and defining a top jaw bore positioned in substantial alignment with said master jaw bore.

28. The jaw assembly of claim 27 wherein said top jaw includes a foot extending into said channel, said foot having a top jaw bottom surface, said top jaw bottom surface and said channel bottom defining a gap.

29. The jaw assembly of claim 27 wherein said assembly includes a dowel positioned within said master jaw bore and wherein said top jaw includes a foot extending into said channel, said foot having a top jaw bottom surface, the entirety of said top jaw bottom surface positioned in a spaced relation from said channel bottom.

* * * * *